(12) United States Patent
Dorovsky (10) Patent No.: US 9,599,749 B2
(45) Date of Patent: Mar. 21, 2017

(54) ELECTROACOUSTIC METHOD OF CONDUCTIVITY MEASUREMENT THROUGH CASING

(75) Inventor: Vitaly N. Dorovsky, Novosibirsk (RU)

(73) Assignee: Baker Hughes Incorporated, Houston, TX (US)

( * ) Notice: Subject to any disclaimer, the term of this patent is extended or adjusted under 35 U.S.C. 154(b) by 306 days.

(21) Appl. No.: 14/365,043

(22) PCT Filed: Oct. 3, 2011

(86) PCT No.: PCT/RU2011/000769
§ 371 (c)(1),
(2), (4) Date: Jun. 12, 2014

(87) PCT Pub. No.: WO2013/051955
PCT Pub. Date: Apr. 11, 2013

(65) Prior Publication Data
US 2014/0320134 A1    Oct. 30, 2014

(51) Int. Cl.
*G01V 11/00* (2006.01)
*G01V 1/44* (2006.01)
*G01V 3/26* (2006.01)
*E21B 49/00* (2006.01)

(52) U.S. Cl.
CPC .............. *G01V 11/00* (2013.01); *E21B 49/00* (2013.01); *G01V 1/44* (2013.01); *G01V 3/26* (2013.01); *G01V 11/007* (2013.01)

(58) Field of Classification Search
CPC ........ G01V 1/44; G01V 11/00; G01V 11/007; G01V 3/26; G01V 1/30; G01V 1/40; G01V 1/46; G01V 1/48; G01V 1/50; G01V 1/52; E21B 49/00
USPC .................. 324/345, 346; 367/14, 25, 37
See application file for complete search history.

(56) References Cited

U.S. PATENT DOCUMENTS

| 3,893,021 | A * | 7/1975 | Meador | E21B 49/00 324/341 |
| 4,685,091 | A * | 8/1987 | Chung | B06B 1/085 181/106 |
| 6,667,621 | B1 * | 12/2003 | Benimeli | G01V 3/20 324/347 |
| 2007/0061083 | A1 * | 3/2007 | Habashy | G01V 3/30 702/11 |

(Continued)

*Primary Examiner* — Tung X Nguyen
*Assistant Examiner* — Robert P Alejnikov, Jr.
(74) *Attorney, Agent, or Firm* — Chowdhury Law Group, P.C.

(57) ABSTRACT

The present disclosure relates to methods and apparatuses for evaluating a porous earth formation. The method may include estimating a value of at least one parameter of interest of the earth formation using a signal indicative of acoustic waves generated at a metallic surface (200) in communication with the earth formation when the metallic surface (200) is exposed to a constant magnetic field (250) normal to the metallic surface (200) and a harmonic magnetic field (260) along the metallic surface. The signal may be generated by a sensor responsive to the acoustic waves. The apparatus may include a first magnetic source (230) configured to generate a constant magnetic field (250), a second magnetic source (240) configured to generate a harmonic magnetic field (260), and a sensor (220) configured to generate a signal in response to acoustic waves.

15 Claims, 7 Drawing Sheets

(56) References Cited

U.S. PATENT DOCUMENTS

| | | | | |
|---|---|---|---|---|
| 2008/0125974 A1* | 5/2008 | Dubinsky | ............... | G01V 3/265 |
| | | | | 702/11 |
| 2009/0058415 A1* | 3/2009 | Dorovsky | ................ | G01V 3/26 |
| | | | | 324/303 |
| 2010/0148804 A1* | 6/2010 | Jakoby | .................... | G01F 1/662 |
| | | | | 324/663 |

\* cited by examiner

ELECTROACOUSTIC METHOD OF CONDUCTIVITY MEASUREMENT THROUGH CASING

BACKGROUND OF THE DISCLOSURE

1. Field of the Disclosure

This disclosure generally relates to exploration and production of hydrocarbons involving investigations of regions of an earth formation penetrated by a borehole. More specifically, the disclosure relates to the characterizing the earth formation using a logging tool in the borehole.

2. Description of the Related Art

A variety of techniques are currently utilized in characterizing earth formations. These methods are designed to determine formation parameters, including, among other things, the resistivity, porosity, dielectric susceptibility, and permeability of a rock formation surrounding a borehole drilled for recovering the hydrocarbons. Electroacoustic methods for earth borehole logging are well known to persons having an ordinary level of skill in the art, and various devices and various techniques have been described for this purpose. Typically, the tools designed to provide the desired information are used to log the borehole. Much of the logging is done after the boreholes have been drilled.

SUMMARY OF THE DISCLOSURE

In view of the foregoing, the present disclosure is directed to a method and apparatus for estimating at least one parameter of interest of an earth formation using a constant magnetic field and a harmonic magnetic field on a metallic surface in communication with an earth formation.

One embodiment according to the present disclosure includes a method of estimating a value of at least one parameter of interest of an earth formation, comprising: estimating the value of the at least one parameter of interest using a signal generated by a sensor responsive to acoustic waves generated at a metallic surface in communication with the earth formation, the metallic surface being exposed to a constant magnetic field normal to the metallic surface and a harmonic magnetic field at a plurality of frequencies along the metallic surface.

Another embodiment according to the present disclosure includes a computer-readable medium product having instructions thereon that, when executed, cause at least one processor to perform a method, the method comprising: estimating a value of at least one parameter of interest using a signal generated by a sensor responsive to acoustic waves generated at a metallic surface in communication with an earth formation, the metallic surface being exposed to a constant magnetic field normal to the metallic surface and a harmonic magnetic field at a plurality of frequencies along the metallic surface.

Another embodiment according to the present disclosure includes an apparatus configured to estimate a value of at least one parameter of interest of an earth formation, comprising: a tool configured to be conveyed into a borehole; a first magnetic source on the tool configured to apply a constant magnetic field to a metallic plate in communication with the earth formation, the constant magnetic field being a direction normal to the metallic surface; a second magnetic source on the tool configured to apply a harmonic magnetic field at a plurality of frequencies along the metallic surface; a sensor configured to generate a signal in response to acoustic waves generated at the metallic surface; and at least one processor configured to estimate the value of the at least one parameter of interest using the signal.

BRIEF DESCRIPTION OF THE DRAWINGS

The present disclosure is best understood with reference to the accompanying figures in which like numerals refer to like elements and in which like numerals refer to like elements and in which.

DETAILED DESCRIPTION OF THE DISCLOSURE

In the disclosure that follows, in the interest of clarity, not all features of actual implementations are described. It will of course be appreciated that in the development of any such actual implementation, as in any such project, numerous engineering and technical decisions must be made to achieve the developers' specific goals and subgoals (e.g., compliance with system and technical constraints), which will vary from one implementation to another. Moreover, attention will necessarily be paid to proper engineering and programming practices for the environment in question. It will be appreciated that such development efforts may be complex and time-consuming, outside the knowledge base of typical laymen, but would nevertheless be a routine undertaking for those of ordinary skill in the relevant fields.

Parameters of interest of an earth formation (or other porous medium) may be estimated using acoustic responses due to a constant magnetic field applied normally to a casing boundary and a harmonic magnetic field applied along the casing boundary. Parameters that may be estimated may include, but are not limited to, a characteristic frequency of the formation and conductivity. Illustrative embodiments of the present claimed subject matter are described in detail below.

Figure 1:
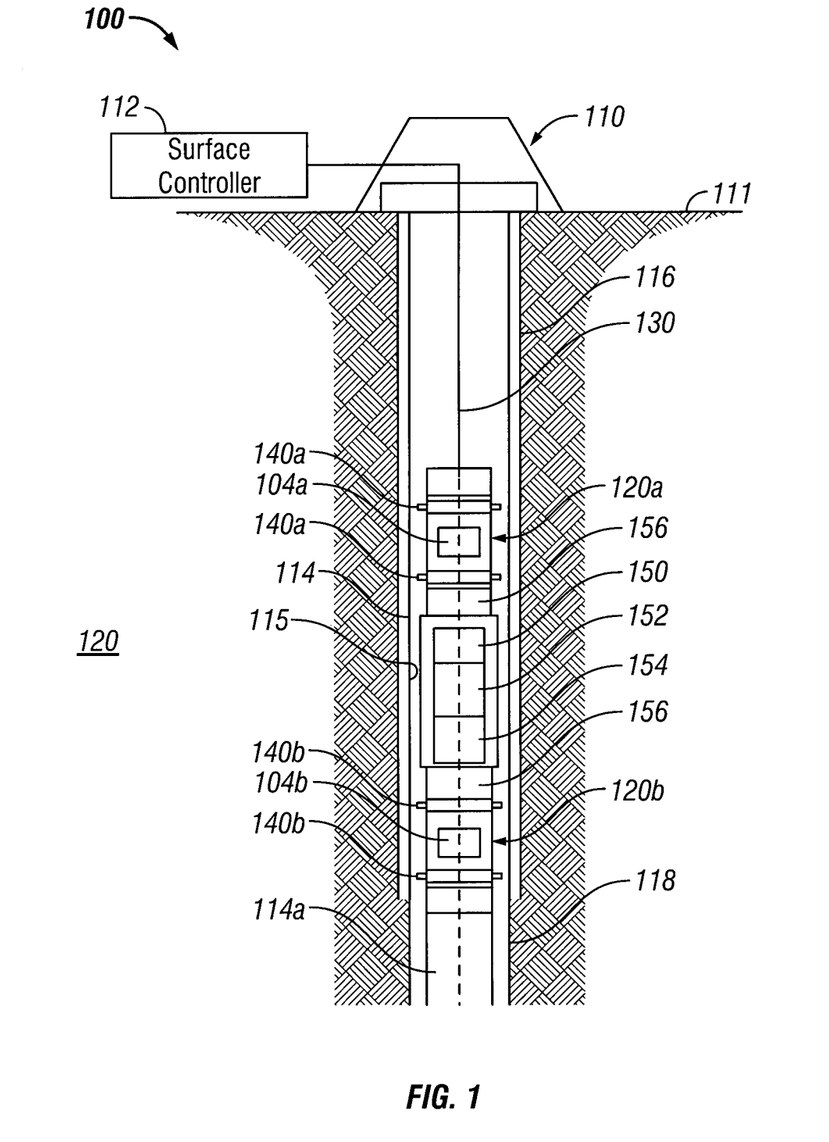
FIG. 1 is a schematic of a drilling site including an electromagnetic tool for estimating at least one parameter of interest of an earth formation according to one embodiment of the present disclosure.

FIG. 1 shows an exemplary apparatus suitable for performing the method of the present disclosure conveyed within a borehole having a casing. FIG. 1 shows a rig 110 on a surface 111 and positioned over a subterranean earth formation of interest 120. The rig 110 may be a part of a land well production/construction facility or an offshore well production/construction facility. A borehole 114 formed below the rig 110 may include a cased portion 116 and/or an open hole portion 118. In certain instances (e.g., during drilling, completion, work-over, and the like), a logging operation may be conducted to collect information relating to the earth formation 120 and/or the borehole 114. Typically, a tool system 100 may be conveyed downhole via an umbilical 130 to measure one or more parameters of interest relating to the earth formation 120, such as resistivity. The term "umbilical" as used hereinafter includes a cable, a wireline, slickline, drill pipe, coiled tubing, or other devices suitable for conveying the tool system 100 into the borehole 114. The tool system 100 may include one or more modules 120*a*, 120*b* each of which has a tool or a plurality of tools 104*a*, 104*b* adapted to perform one or more downhole tasks. The term "module" includes a device such as a sonde or sub that is suited to enclose or otherwise support a device that is to be deployed into the borehole. While two proximally positioned modules and two associated tools are shown, it should be understood that any finite number may be used.

The tool 104*a* may be a formation evaluation (FE) tool adapted to measure one or more parameters of interest relating to the earth formation and/or the borehole. The term formation evaluation (FE) tool encompasses measurement devices, sensors, and other like devices that, actively or passively, collect data about the various characteristics of the earth formation 120, directional sensors for providing information about the tool system 100 orientation or direction of movement, formation testing sensors for providing information about the characteristics of the reservoir fluid or for evaluating the reservoir conditions. The formation evaluation (FE) sensors may include resistivity sensors for determining the earth formation 120 resistivity or dielectric constant of the earth formation or the presence or absence of hydrocarbons; acoustic sensors for determining the acoustic porosity of the earth formation and the bed boundary in the earth formation; nuclear sensors for determining density of the earth formation, nuclear porosity and/or certain rock characteristics; or nuclear magnetic resonance (NMR) sensors for determining the porosity and/or other petrophysical characteristics of the earth formation. The direction and position sensors may include a combination of one or more accelerometers, gyroscopes, or magnetometers. The accelerometers preferably may provide measurements along three axes, in particular along three substantially mutually perpendicular axes. The formation testing sensors may collect earth formation fluid samples and determine the properties of the fluid, which may include physical or chemical properties. Pressure measurements may provide information about certain characteristics of the reservoir.

The tool system 100 may include telemetry equipment 150, a local or downhole processor or controller 152, and a downhole power supply 154. The telemetry equipment 150 may provide two-way communication for exchanging data signals between a surface controller or processor 112 and the tool system, as well as for transmitting control signals from the surface controller to the tool system.

A first module 120*a* may include a first tool 104*a* configured to measure a first parameter of interest and a second module 120*b* may include a second tool 104*b* that is configured to measure a second parameter of interest. In order to execute their assigned tasks, the first tool and the second tool may be in different positions. The positions can be with reference to an object such as the borehole 114, a borehole wall 115, or other proximally positioned tooling. The term "position" may be understood to encompass a radial position, an inclination, and/or an azimuthal orientation. In the illustration of FIG. 1, the longitudinal axis 114*a* of the borehole ("the borehole axis") is used as a reference axis to describe the relative radial positioning of the tools 104*a*, 104*b*. Other objects or points may also be used as a reference frame against which movement or position can be described. Moreover, the tasks of the tools may change during a borehole-related operation. Generally speaking, the tool may be adapted to execute a selected task based on one or more selected factors. These factors may include, but may not be limited to depth, time, changes in earth formation characteristics, and/or the changes in tasks of other tools.

In an exemplary embodiment, the modules 120*a* and 120*b* may each be provided with positioning devices 140*a*, 140*b*, respectively, which are configured to maintain the respective modules 120*a*, 120*b* at selected radial positions relative to a reference position (e.g., the borehole axis 114*a*). The positioning devices may also adjust the radial positions of the respective modules upon receiving one or more surface command signals or automatically in a closed-loop type manner. These selected radial positions may be maintained or adjusted independently of the radial position(s) of an adjacent downhole device (e.g., measurement tools, sonde, module, sub, or other like equipment). An articulated member, such a flexible joint 156 that couples the respective modules to the tool system 100 may provide a degree of bending or pivoting to accommodate the radial positioning differences between adjacent modules or other equipment (for example, a processor sonde). One or more of the positioning devices may have fixed positioning members.

Figure 2A:
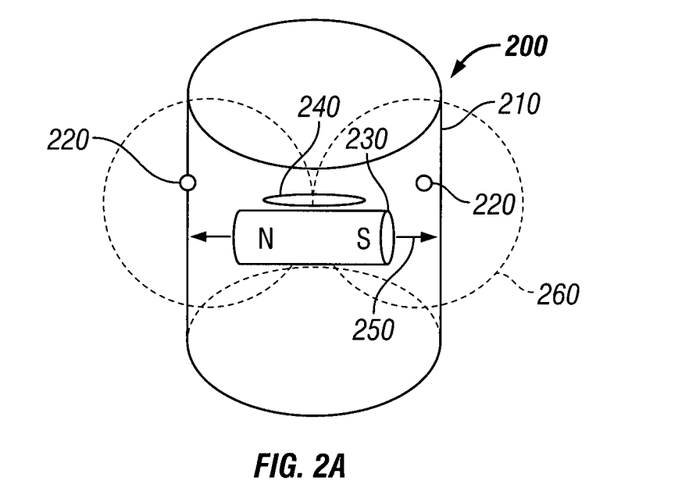
FIG. 2A is a schematic view of a magnet configuration for an electromagnetic tool using a coil to generate a harmonic magnetic field in accordance with one embodiment of the present disclosure.
Figure 2B:
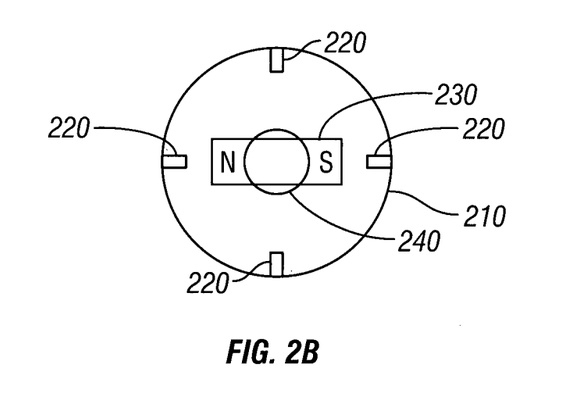
FIG. 2B is a top view of a schematic of an electromagnetic tool of FIG. 2A.

FIGS. 2A and 2B illustrate an electromagnetic tool 200 that may be included in tool 100. Electromagnetic tool 200 may include a housing 210. In some embodiments, the housing 210 may be umbilical 130. Electromagnetic tool 200 may also include a magnetic source 230 configured to generate a constant magnetic field 250 in a direction substantially normal to a metallic surface, such as casing 116. Magnetic source 230 may include one or more of: (i) a permanent magnet and (ii) an electromagnet. Electromagnetic tool 200 may also include magnetic source 240 configured to generate a harmonic magnetic field 260 along the metallic surface. Magnetic source 240 may include a coil. One or more sensors 220 may be disposed on the housing 210 and configured to generate signals responsive to acoustic waves generated at a metallic surface interacting with the magnetic fields 250, 260.

Figure 3A:
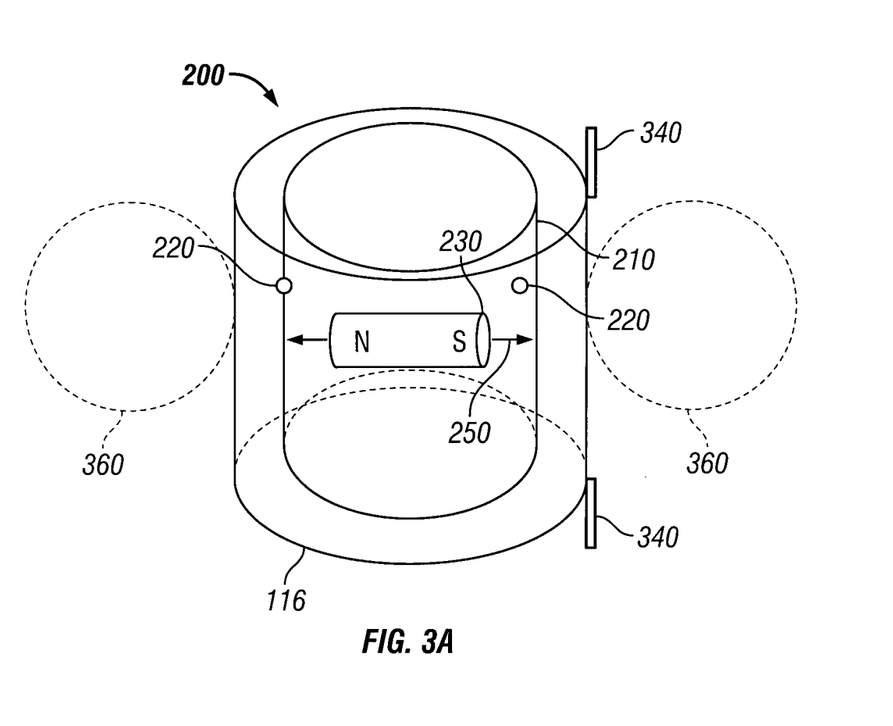
FIG. 3A is a schematic view of another magnet configuration for an electromagnetic tool using an alternating electric current in the housing to generate a harmonic magnetic field in accordance with one embodiment of the present disclosure.
Figure 3B:
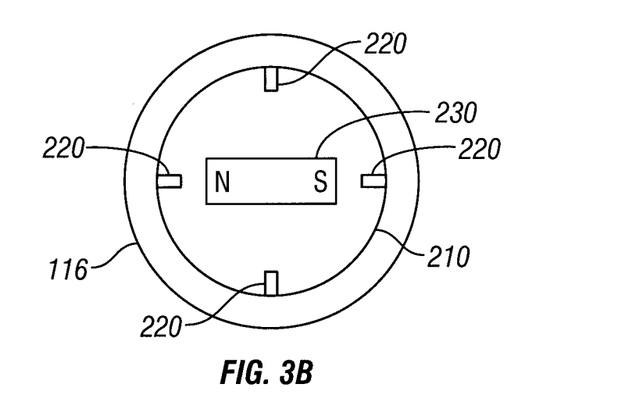
FIG. 3B is a top view of a schematic of the electromagnetic tool of FIG. 3A.

FIGS. 3A and 3B illustrate another embodiment of the present disclosure, where an electromagnetic tool 300 may be included in tool 100. Electromagnetic tool 300 may include housing 210, which, in some aspects, may be umbilical 130. Electromagnetic tool 300 may also include magnetic source 230 configured to generate a constant magnetic field 250 in a direction substantially normal to a metallic surface, such as casing 116. Electromagnetic tool 200 may also include electrodes 340 configured pass an alternating electric current axially through a length of casing 116 to generate a circumferential harmonic magnetic field 360 along the metallic surface. One or more sensors 220 may be disposed on the housing 210 and configured to generate signals responsive to acoustic waves generated at a metallic surface interacting with the magnetic fields 250, 360.

Figure 4:
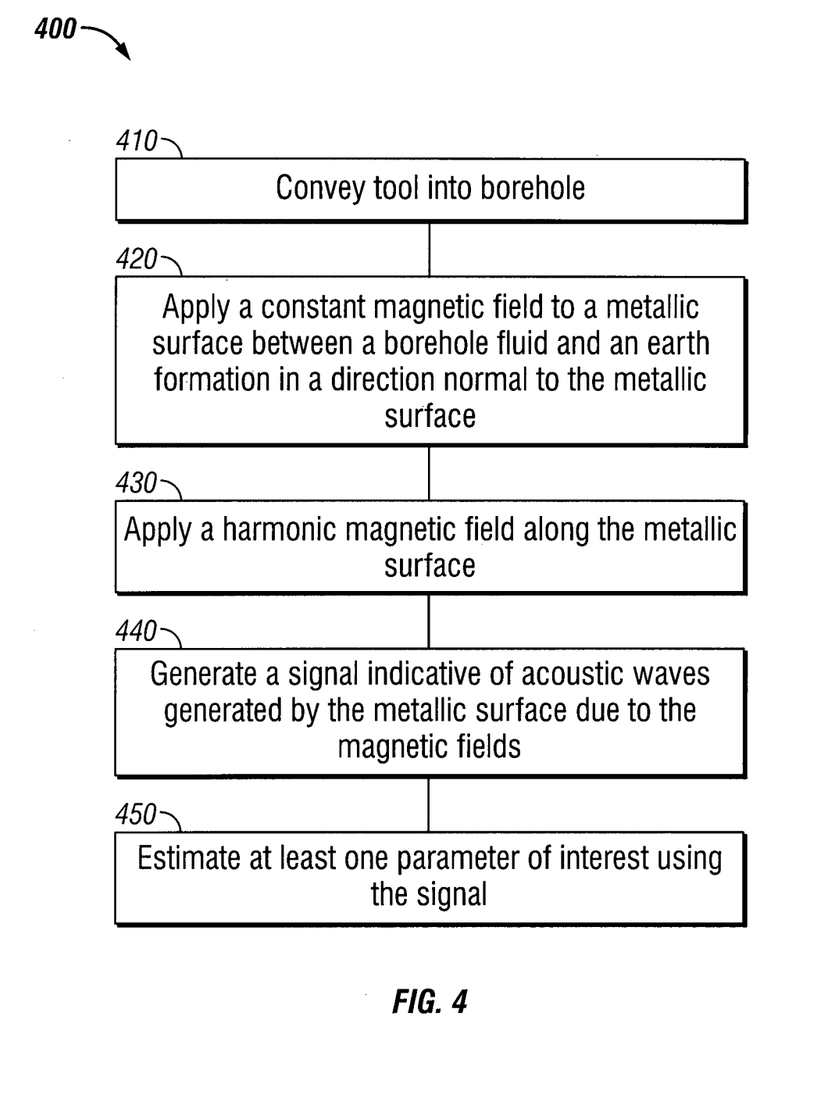
FIG. 4 is a flow chart for a method for one embodiment according to the present disclosure.

Embodiments of the apparatus according to the present disclosure may be used to perform a method. FIG. 4 shows a flow chart for one embodiment of the method 400. In step 410, the tool 200 may be conveyed in borehole 114. In step 420, a constant magnetic field 250 may be applied by magnetic source 230 in tool 200 to a metallic surface, such as a casing 116 between the earth formation 120 and a downhole fluid in the borehole 114. The constant magnetic field 250 may be applied in a direction normal to the metallic surface. In step 430, magnetic source 240 may be energized to apply a harmonic magnetic field 260 to the casing 116. In an alternative embodiment, step 340 may include energizing electrodes 240 to apply harmonic magnetic field 360. In step 440, a sensor 220 may be used to generate a signal indicative of an acoustic response generated at the metallic surface due to the magnetic fields 250, 260/360. The acoustic response may include a deformation velocity of the inner part of the casing 116. In step 450, the value of at least one parameter of interest of the earth formation 120 may be estimated using the signal from the sensor 220. In some embodiments, step 450 may include estimating one or more of: (i) a characteristic frequency of the earth formation 120 and (ii) a conductivity of the earth formation 120.

Figure 5:
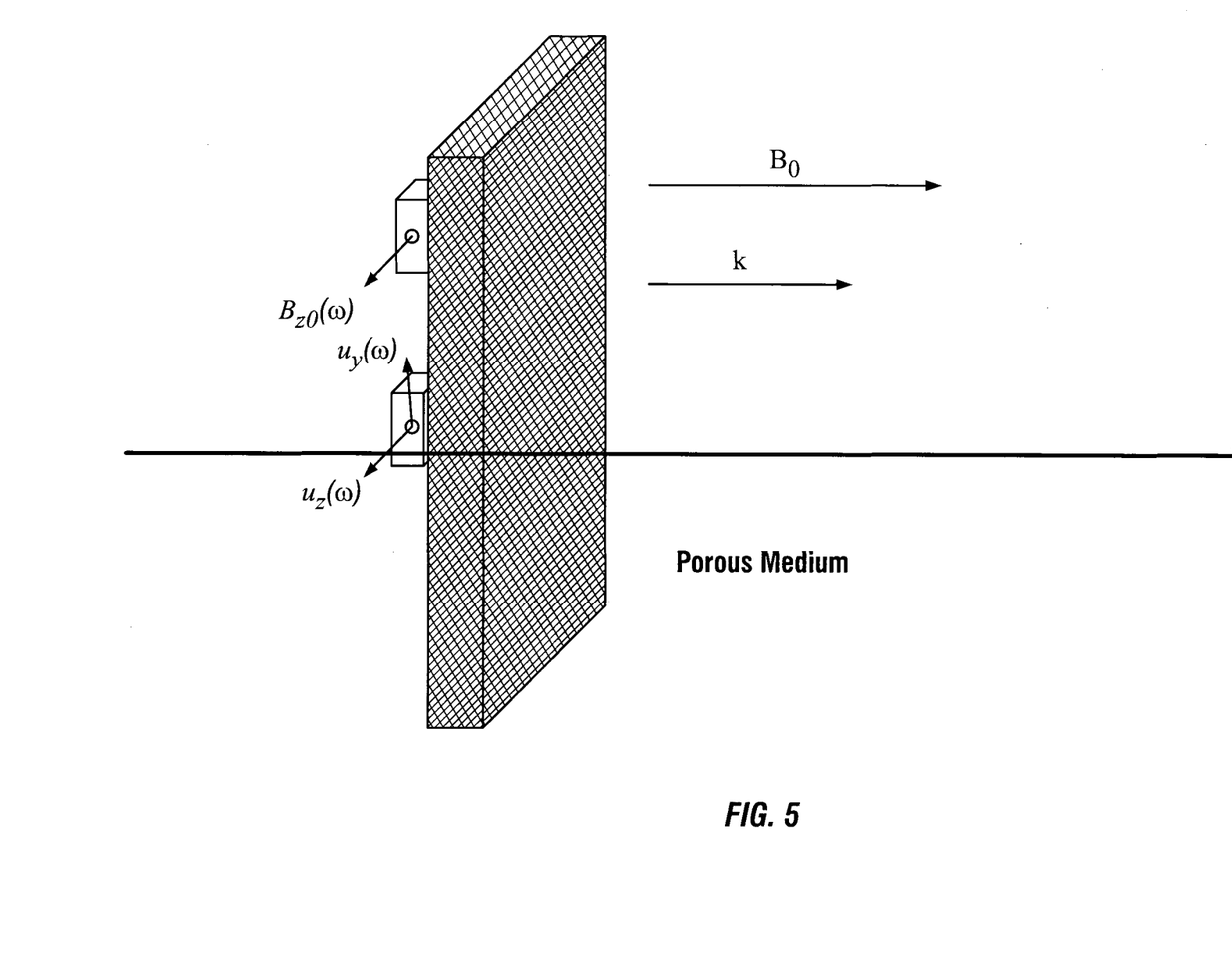
FIG. 5 schematically illustrates the coordinate system used in the discussion herein.

Turning now to FIG. 5, the theoretical basis for the method may include treating the borehole casing next to an earth formation as a metallic plate in contact with a porous medium. To analyze the character of acoustic response from a metallic plate (with harmonic magnetic field applied to its surface) lying on porous medium, a metallic conductivity zone "ext" may correspond to coordinate values x=−l, 0; l−screen thickness and metallic conductivity zone "in" may be a porous electrolyte saturated medium that corresponds to coordinate values x=[0, ∞]. Harmonic magnetic field $B_{z0}$ (spectral component) may be applied to the surface x=−l. Constant magnetic field $B_0$ is directed normally to the surface. At this surface the spectral components of acoustic response both along z-axis and along y-axis may be obtained. Spectral components of acoustic and magnetic fields in the metallic screen, in conditions of absence of interaction, may be performed using following dependencies:

$$B_z^{ext} = c_1[e^{kx} - e^{-k(x+2l)}] + B_{z0} \cdot e^{-k(x+l)}, \quad (1)$$

$$B_y^{ext} = d_1[e^{kx} - e^{-k(x+2l)}], k = \frac{1-i}{2\lambda_*}, \lambda_*^2 = \frac{c^2}{4\pi\sigma_*\mu_*\omega}$$

$$u_z^{ext} = \lambda_0, u_y^{ext} = \beta_0.$$

where c is the speed of light and $\lambda_*$ is the size of the skin layer. It may be assumed that acoustic approximation for uniform deformation is used here for low frequencies.

A system with an interaction between two groups of S-waves in the electrolyte-saturated porous system in the presence of external magnetic fields, taking into account the electrokinetic effect, may be expressed by equations as follows:

$$\ddot{u} - c_t^2 \Delta u - a_1 \nabla div u + a_2 \nabla div v - \frac{\sigma_s}{4\pi\sigma\rho_{0,s}} rot\dot{B} \wedge B_0 + \quad (2)$$

$$\frac{\rho_{0,l}^2}{\rho_{0,s}}\left(\chi^\partial - \frac{\alpha^2}{\sigma}\right)(\dot{u} - \dot{v}) + \frac{\alpha c_e \rho_{0,l}}{4\pi\sigma\rho_{0,s}} rot\dot{B} = 0,$$

$$\ddot{v} - a_4 \nabla div v + a_3 \nabla div u - \quad (3)$$

$$\frac{\sigma_l}{4\pi\sigma\rho_{0,l}} rot\dot{B} \wedge B_0 - \rho_{0,l}\left(\chi^\partial - \frac{\alpha^2}{\sigma}\right)(\dot{u} - \dot{v}) - \frac{\alpha c_e}{4\pi\sigma} rot\dot{B} = 0,$$

$$\dot{B} = rot\left[-\frac{c_e^2}{4\pi\sigma}rotB + \frac{\alpha c_e \rho_{0,l}}{\sigma}(u-v) + \frac{\sigma_s}{\sigma}u \wedge B^0 + \frac{\sigma_l}{\sigma}v \wedge B^0\right]. \quad (4)$$

In the equations above:
$B_z^{in}$ may be the magnetic field in the porous medium;
$B_z^{ext}$ may be the magnetic field in the metal layer;
$B_0$ may be longitudinal magnetic field due to the external stationary magnetic field;
$u_z^{in}$ may be the deformation velocity of the porous medium matrix;
$u_z^{ext}$ may be the deformation velocity of the layer;
$v_z^{in}$ may be the fluid velocity in the porous medium;
$\rho_{0,l}$, $\rho_{0,s}$ are partial densities of the porous medium such that $\rho_0 = \rho_{0,l} + \rho_{0,s}$ may be the density of the porous medium;
$\rho_*$ may be the density of the highly-conductive layer;
$\mu^{ext}$, $\mu^{in}$ may be shift moduli corresponding to the layer and the porous medium;
$\mu_*$ may be inductivity (magnetic permittivity) of the metal;
$\sigma$ may be the conductivity of the porous medium;
$\sigma_*$ may be the conductivity of the layer;
$\sigma_s$ may be the conductivity of the matrix;
$\sigma_l$ may be the conductivity of the liquid;
$c_t$ may be the velocity of shear sound in the porous medium;
$c_t^*$ may be the velocity of shear sound in the metal;
c may be the electromagnetic constant;
$\bar{\omega} = \rho_{0,l}\chi^\partial$ may be the characteristic velocity; and
$\chi^\partial$ may be the friction coefficient.

Equations which determine the amplitude of the magnetic field B and velocities u, v, contain four parameters $$a_1 = \frac{c_t^2}{3} + \frac{K}{\rho_{0,s}} - \frac{2K}{\rho_0} + \alpha_e\rho_{0,s}, a_2 = \frac{\rho_{0,l}}{\rho_0}\left(\frac{K}{\rho_{0,s}} - \alpha_e\rho_0\right), \quad (5)$$

$$a_3 = \frac{K}{\rho_0} - \alpha_e\rho_{0,s}, a_4 = \alpha_e\rho_{0,l}$$

depending on elastic moduli $K = 2\mu/3 + \lambda$, $\mu$, $\alpha_e$, which are, in their turn, found through two longitudinal velocities of sound $c_{l1}$, $c_{l2}$ and a transverse one $c_t$ $$c_{l1}^2 = B_*\left(1 + \sqrt{1 - \frac{b_*}{B_*^2}}\right), \quad (6)$$

$$c_{l2}^2 = B_*\left(1 - \sqrt{1 - \frac{b_*}{B_*^2}}\right), c_t^2 = \frac{\mu}{\rho_{0,s}},$$

where $$B_* = \frac{1}{2}\left(\alpha_e\rho_0 - \frac{2K}{\rho_0} + \frac{K}{\rho_0}\frac{2\mu+\lambda}{2\mu/3+\lambda}\frac{\rho_0}{\rho_{0,s}}\right),$$

$$b_* = (2\mu+\lambda)\left(\frac{1}{\rho_{0,s}} - \frac{1}{\rho_0}\right)\left(\alpha_e\rho_0 - \frac{K^2}{\rho_0(2\mu+\lambda)}\right).$$

These equations contain the kinetic parameter $\chi^\partial$, which determines the friction force between the matrix and the fluid. The friction force contained in the motion equations for the fluid moving in a porous matrix, $f^\partial$, may be expressed as:

$$f^\partial = \chi^\partial(\rho u - j) + \alpha_{12}\left(E + \frac{j^e}{c_e\chi_e} \wedge B\right),$$

and

The density of the electric current, $j^e$, may be expressed as:

$$j^e - \chi_s u - \chi_l v = \alpha_{21}(\rho u - j) + \sigma\left(E + \frac{j^e}{c_e \chi_e} \wedge B\right).$$ (5)

where E is the electric field vector, B is a magnetic field vector, $\chi_l$, $\chi_s$, may be densities of bulk charges of corresponding sub-systems, $\chi_e$ may be density of electric charge, $\rho$ may be density, and $j^e$ may be density of electric current. The term "friction coefficient" may be used for the kinetic coefficient $\chi^3$. The coefficient $\alpha = \alpha_{12} = \alpha_{21}$ may be linked to the electromagnetic constant.

As shown in FIG. 3, S-waves may propagate along the x-axis. Electric and magnetic fields have components in the orthogonal plane (y,z). Assuming that the containing matrix has no conductivity, the coordinate form the above equations are as follows:

$$\ddot{u}_z - c_t^2 \frac{\partial^2 u_z}{\partial x^2} + \frac{\rho_{0,l}^2}{\rho_{0,s}}\overline{\chi}(\dot{u}_z - \dot{v}_z) + \frac{\alpha c_e \rho_{0,l}}{4\pi\sigma \rho_{0,s}}\frac{\partial \dot{B}_y}{\partial x} = 0,$$ (7)

$$\dot{v}_z - \frac{B_0}{4\pi\rho_{0,l}}\frac{\partial \dot{B}_z}{\partial x} - \rho_{0,l}\overline{\chi}(\dot{u}_z - \dot{v}_z) - \frac{\alpha c_e}{4\pi\sigma}\frac{\partial \dot{B}_y}{\partial x} = 0,$$

$$\ddot{u}_y - c_t^2 \frac{\partial^2 u_y}{\partial x^2} + \frac{\rho_{0,l}^2}{\rho_{0,s}}\overline{\chi}(\dot{u}_y - \dot{v}_y) - \frac{\alpha c_e \rho_{0,l}}{4\pi\sigma \rho_{0,s}}\frac{\partial \dot{B}_z}{\partial x} = 0,$$

$$\dot{v}_y - \frac{B_0}{4\pi\rho_{0,l}}\frac{\partial \dot{B}_y}{\partial x} - \rho_0 \overline{\chi}(\dot{u}_y - \dot{v}_y) + \frac{\alpha c_e}{4\pi\sigma}\frac{\partial \dot{B}_z}{\partial x} = 0,$$

$$\frac{\partial B_y}{\partial t} = \frac{\partial}{\partial x}\left[\frac{c_e^2}{4\pi\sigma}\frac{\partial B_y}{\partial x} - \frac{\alpha c_e \rho_{0,l}}{\sigma}(u_z - v_z) + v_y B_0\right], \text{ and}$$

$$\frac{\partial B_z}{\partial t} = \frac{\partial}{\partial x}\left[\frac{c_e^2}{4\pi\sigma}\frac{\partial B_z}{\partial x} + \frac{\alpha c_e \rho_{0,l}}{\sigma}(u_y - v_y) + v_z B_0\right].$$

In this system, the friction coefficient may be the result of this combination: $\overline{\chi} = \chi - \alpha^2/\sigma$. The shape and distribution of the fields is chosen as follows:

$$B^0 = (B_0, 0, 0), B = (0, B_y, B_z),$$

$$v = (0, v_y, v_z), u = (0, u_y, u_z).$$ (8)

The electrokinetic effect may reduce the friction coefficient. The value of the friction coefficient may be estimated after proper measurements are made. The relationship between the amplitudes of the electromagnetic fields and acoustic waves in an infinite medium during plane wave propagation may be expressed as:

$$(v_y, v_z, u_y, u_z, B_y, B_z) = (v_y, v_z, u_y, u_z, B_y, B_z)\cdot\exp(i\omega x/\xi - i\omega t)$$ (9), where $\xi$ is phase velocity.

Substituting the latter dependence into the initial equations, the non-contradiction conditions may be reduced to finding the sound velocity from the equation:

$$\varepsilon - \left(1 + \frac{\omega_*^2}{\overline{\omega}^2}\right)\left(\frac{c_t^2}{\xi^2} - 1\right) + i\varepsilon\frac{\omega_*^2}{\overline{\omega}\omega} =$$ (10)

$$4\pi\frac{\sigma}{\hat{\omega}}\left(\frac{\xi^2}{c_e^2} + \frac{i\omega}{4\pi\sigma}\right)\left[\left(1 - \frac{c_t^2}{\xi^2}\right)\left(1 + i\frac{\overline{\omega}}{\omega}\right) + i\varepsilon\frac{\overline{\omega}}{\omega}\right].$$

Meanwhile, the relationship between the amplitudes of the matrix oscillations and the magnetic field may be determined by the equations:

$$B_y = \frac{4\pi\xi\sigma}{\alpha c\varepsilon}\frac{\left(1 - \frac{c_t^2}{\xi^2}\right)\left(1 + i\frac{\overline{\omega}}{\omega}\right) + i\varepsilon\frac{\overline{\omega}}{\omega}}{1 - \frac{\omega_*^2}{\omega^2}}\left(u_z - i\frac{\omega_*}{\omega}u_y\right),$$ (11)

$$B_z = -\frac{4\pi\xi\sigma}{\alpha c\varepsilon}\frac{\left(1 - \frac{c_t^2}{\xi^2}\right)\left(1 + i\frac{\overline{\omega}}{\omega}\right) + i\varepsilon\frac{\overline{\omega}}{\omega}}{1 - \frac{\omega_*^2}{\omega^2}}\left(u_y + i\frac{\omega_*}{\omega}u_z\right).$$

where the following notations are used:

$$\varepsilon = \frac{\rho_{0,l}}{\rho_{0,s}}, \overline{\omega} = \rho_{0,l}\overline{\chi}, \hat{\omega} = \frac{\rho_{0,l}\alpha^2}{\sigma}, \omega_* = \frac{B_0}{c_e}\frac{\overline{\chi}\sigma}{\alpha}.$$

Transversal oscillations considered here exist in the half-space x>0 connected to the porous medium. On the boundary x=0, the following conditions apply. They are the continuity of tangential velocity, the tangential electrical field, and the tangential magnetic field:

$$u_y^{ext} = u_y, u_z^{ext} = u_z, \frac{\partial u_y^{in}}{\partial x} = \frac{\partial u_z^{in}}{\partial x} = 0,$$ (12)

$$B_z^{ext} = \mu_* B_z, B_y^{ext} = \mu_* B_y,$$

$$\frac{c}{4\pi\sigma_*\mu_*}\frac{\partial B_y^{ext}}{\partial x} + \frac{B_0}{c}u_y^{ext} = \frac{c}{4\pi\sigma}\frac{\partial B_y}{\partial x} + \frac{B_0}{c}u_y,$$

$$\frac{c}{4\pi\sigma_*\mu_*}\frac{\partial B_z^{ext}}{\partial x} + \frac{B_0}{c}u_z^{ext} = \frac{c}{4\pi\sigma}\frac{\partial B_z}{\partial x} + \frac{B_0}{c}u_z.$$

The waves that are harmonic in relation to time may be expressed as:

$$(v_y, v_z, u_y, u_z, B_y, B_z) = (v_y, v_z, u_y, u_z, B_y, B_z)\cdot\exp(-i\omega t)$$ (13)

Substituting the solution from eqn. (9) into eqn. (7), fluid velocity may be expressed through spatial derivatives of the magnetic field and deformation velocities of the porous matrix.

$$v_z = i\frac{c_e\alpha}{4\pi\sigma\omega(1 + i\overline{\omega}/\omega)}\frac{\partial B_y}{\partial x} +$$ (14)

$$i\frac{B_0}{4\pi\rho_{0,l}\omega(1 + i\overline{\omega}/\omega)}\frac{\partial B_z}{\partial x} + \frac{i\overline{\omega}/\omega}{(1 + i\overline{\omega}/\omega)}u_z,$$

$$v_y = -i\frac{c_e\alpha}{4\pi\sigma\omega(1 + i\overline{\omega}/\omega)}\frac{\partial B_z}{\partial x} +$$

$$i\frac{B_0}{4\pi\rho_{0,l}\omega(1 + i\overline{\omega}/\omega)}\frac{\partial B_y}{\partial x} + \frac{i\overline{\omega}/\omega}{(1 + i\overline{\omega}/\omega)}u_y.$$

Excluding velocities $v_z$, $v_y$ from set (10), magnetic fields and velocities of elastic deformations of the matrix in the half-space may be determined with the equations:

$$\alpha_1 \frac{\partial^2 B_z}{\partial x^2} + i\omega B_z - \alpha_2 \frac{\partial u_y}{\partial x} + \alpha_3 \frac{\partial u_z}{\partial x} = 0,$$

-continued $$\alpha_1 \frac{\partial^2 B_y}{\partial x^2} + i\omega B_y + \alpha_2 \frac{\partial u_z}{\partial x} + \alpha_3 \frac{\partial u_y}{\partial x} = 0,$$

$$c_t^2 \frac{\partial^2 u_y}{\partial x^2} + \varphi_1 u_y + \psi_1 \frac{\partial B_y}{\partial x} - \psi_2 \frac{\partial B_z}{\partial x} = 0,$$

$$c_t^2 \frac{\partial^2 u_z}{\partial x^2} + \varphi_1 u_z + \psi_1 \frac{\partial B_z}{\partial x} + \psi_2 \frac{\partial B_y}{\partial x} = 0.$$

The spatial shape of these waves can be determined from the boundary conditions given above, but the condition of amplitude attenuation in the infinity should be also added. In these equations the following notations are used:

$$\alpha_1 = \frac{c_e^2}{4\pi\sigma}\left[1 + \frac{i}{1+i\bar\omega/\omega}\left(\frac{\hat\omega}{\omega} + \frac{\omega_*^2\hat\omega}{\omega\bar\omega^2}\right)\right],$$

$$\alpha_2 = -\frac{\alpha\rho_{0,t}c_e}{\sigma(1+i\bar\omega/\omega)},$$

$$\alpha_3 = \frac{i\bar\omega B_0}{\omega(1+i\bar\omega/\omega)},$$

$$\varphi_1 = \omega^2\left(1 + \frac{i\varepsilon\bar\omega/\omega}{1+i\bar\omega/\omega}\right),$$

$$\psi_1 = \frac{B_0}{4\pi\rho_{0,s}}\frac{\bar\omega}{1+i\bar\omega/\omega},$$

$$\psi_2 = \frac{i\alpha c_e\varepsilon}{4\pi}\frac{\omega/\sigma}{1+i\bar\omega/\omega}.$$

The set of equations obtained can be conveniently reduced to one equation which determines deformation velocity of the matrix:

$$\frac{\partial^4(u_z, u_y)}{\partial x^4} + \left(\frac{\varphi_1}{c_t^2} + \frac{i\omega}{\alpha_1} - \frac{\theta}{c_t^2\alpha_1}\right)\frac{\partial^2(u_z, u_y)}{\partial x^2} + \frac{i\omega\varphi_1}{c_t^2\alpha_1}(u_z, u_y) = 0,$$

and after this the magnetic field $B=(0, B_y, B_z)$ may be determined from eqn. (14). Equation has the following solutions:

$$u_z = N_{1z}e^{-\beta_1 x} + N_{2z}e^{-\beta_2 x},$$

$$u_y = N_{1y}e^{-\beta_1 x} + N_{2y}e^{-\beta_2 x}. \tag{15}$$

A dispersion equation which determines exponential factors may have the form:

$$\beta^4 + \left(\frac{\varphi_1}{c_t^2} + \frac{i\omega}{\alpha_1} - \frac{\theta}{c_t^2\alpha_1}\right)\beta^2 + \frac{i\omega\varphi_1}{c_t^2\alpha_1} = 0.$$

It should be noted that this frequency function:

$$\theta = \frac{i\varepsilon c_e^2}{4\pi\sigma}\left(\frac{\omega_*^2}{\omega^2} - 1\right)\frac{\omega\hat\omega}{(1+i\bar\omega/\omega)^2}$$

may become zero at the external impact frequency equal the resonance frequency ($\omega=\omega_*$), and in this case the dispersion equation is factorized:

$$\left(\beta^2 + \frac{\varphi_1}{c_t^2}\right)\left(\beta^2 + \frac{i\omega_*}{\alpha_1}\right) = 0.$$

The roots of the above equation may be expressed as:

$$\beta_2^2 = -\frac{\varphi_1}{c_t^2}, \tag{16}$$

$$\beta_1^2 = -\frac{i\omega_*}{\alpha_1}.$$

The roots with positive real parts may be used to determine harmonic magnetic field components, which may be expressed with the following equations:

$$B_z = i\frac{\omega}{\omega_*}\frac{\Lambda(\beta_1)}{\beta_1}N_{1y}e^{-\beta_1 x} - \frac{\Lambda(\beta_1)}{\beta_1}N_{1z}e^{-\beta_1 x} +$$
$$i\frac{\omega}{\omega_*}\frac{\Lambda(\beta_2)}{\beta_2}N_{2y}e^{-\beta_2 x} - \frac{\Lambda(\beta_2)}{\beta_2}N_{2z}e^{-\beta_2 x},$$

$$B_y = -\frac{\Lambda(\beta_1)}{\beta_1}N_{1y}e^{-\beta_1 x} - i\frac{\omega}{\omega_*}\frac{\Lambda(\beta_1)}{\beta_1}N_{1z}e^{-\beta_1 x} -$$
$$\frac{\Lambda(\beta_2)}{\beta_2}N_{2y}e^{-\beta_2 x} - i\frac{\omega}{\omega_*}\frac{\Lambda(\beta_2)}{\beta_2}N_{2z}e^{-\beta_2 x},$$

where $$\Lambda(\beta) = 4\pi\frac{\sigma c_t^2}{\hat\omega c_e^2}\left(1 + i\frac{\bar\omega}{\omega}\right)\frac{\rho_{0,s}\bar X B_0}{\omega^2 - \omega_*^2}\left(\beta^2 + \frac{\varphi_1}{c_t^2}\right).$$

The linear system solution including given boundary conditions is of the following form:

$$\beta_0 = \left[\left(d_1 - i\frac{\omega}{\omega_*}c_1\right) - i\frac{\omega}{\omega_*}\cdot\frac{B_{oz}}{e^{kl} - e^{-kl}}\right],$$

$$\lambda_0 = \left[\left(c_1 + i\frac{\omega}{\omega_*}d_1\right) + \frac{B_{oz}}{e^{kl} - e^{-kl}}\right],$$

$$c_1 = \frac{F_{12}R_3 - F_{34}R_2}{R_1R_3 - R_4R_2},$$

$$d_1 = \frac{F_{34}R_1 - F_{12}R_4}{R_1R_3 - R_4R_2}$$

Notations here, $$F_{12} = \frac{k\lambda_*^2}{\xi_*}(\beta_2 - \beta_1)\left(1 - \frac{\omega^2}{\omega_*^2}\right)e^{-kl}B_{0z} +$$
$$\frac{B_{0z}e^{-kl}}{1 - e^{-2kl}}\left[i\frac{\omega}{\omega_*}(\beta_1\zeta_2 - \beta_2\zeta_1) - \frac{B_0}{\omega}(\beta_2 - \beta_1) + \beta_2\zeta_3 - \beta_1\zeta_4\right],$$

$$F_{34} = \frac{B_{0z}}{e^{kl} - e^{-kl}}\left[i\frac{\omega}{\omega_*}\left(\frac{B_0}{\omega} - \frac{\beta_1\zeta_2 - \beta_2\zeta_1}{\beta_2 - \beta_1}\right) + \frac{\beta_1\zeta_2 - \beta_2\zeta_1}{\beta_2 - \beta_1}\right],$$

$$R_1 = \frac{k\lambda_*^2}{\xi_*}(\beta_2 - \beta_1)\left(1 - \frac{\omega^2}{\omega_*^2}\right)(1 + e^{-2kl})\cdot B_{0z} +$$
$$\frac{B_0}{\omega}(\beta_2 - \beta_1) - i\frac{\omega}{\omega_*}(\beta_1\zeta_2 - \beta_2\zeta_1) + \beta_1\zeta_4 - \beta_2\zeta_3,$$

-continued $$R_4 = -F_{34},$$

$$R_2 = i\frac{\omega}{\omega_*}\left(\frac{B_0}{\omega}(\beta_2 - \beta) + \beta_1\zeta_4 - \beta_2\zeta_3\right) + \beta_1\zeta_2 - \beta_2\zeta_1,$$

$$R_3 = \frac{k\lambda_*^2}{\xi_*}\left(1 - \frac{\omega^2}{\omega_*^2}\right)(1 + e^{-2kl}) \cdot B_{0z} + \frac{B_0}{\omega} - \frac{\beta_1\zeta_3 - \beta_2\zeta_4}{(\beta_2 - \beta_1)} + \frac{-\beta_1\zeta_2 + \beta_2\zeta_1}{(\beta_2 - \beta_1)},$$

$$\zeta_1 = -i\frac{\omega}{\omega_*}\Lambda_1\left[\frac{c^2}{4\pi\sigma\omega} + \frac{iB_0^2}{4\pi\rho_l\omega^2(1 + i\overline{\omega}/\omega)}\right] + \frac{i\alpha B_0 c \Lambda_1}{4\pi\sigma\omega^2(1 + i\overline{\omega}/\omega)},$$

$$\zeta_2 = -i\frac{\omega}{\omega_*}\Lambda_2\left[\frac{c^2}{4\pi\sigma\omega} + \frac{iB_0^2}{4\pi\rho_l\omega^2(1 + i\overline{\omega}/\omega)}\right] + \frac{i\alpha B_0 c \Lambda_2}{4\pi\sigma\omega^2(1 + i\overline{\omega}/\omega)},$$

$$\zeta_3 = \Lambda_1\left[\frac{c^2}{4\pi\sigma\omega} + \frac{iB_0^2}{4\pi\rho_l\omega^2(1 + i\overline{\omega}/\omega)}\right] - \frac{\alpha B_0 c \Lambda_1}{4\pi\sigma\omega\omega_*(1 + i\overline{\omega}/\omega)} + \frac{iB_0\overline{\omega}}{\omega^2(1 + i\overline{\omega}/\omega)},$$

$$\zeta_4 = \Lambda_2\left[\frac{c^2}{4\pi\sigma\omega} + \frac{iB_0^2}{4\pi\rho_l\omega^2(1 + i\overline{\omega}/\omega)}\right] - \frac{\alpha B_0 c \Lambda_2}{4\pi\sigma\omega\omega_*(1 + i\overline{\omega}/\omega)} + \frac{iB_0\overline{\omega}}{\omega^2(1 + i\overline{\omega}/\omega)}.$$

$$\xi_* = \frac{1}{\mu_* L_0} \cdot \frac{(\beta_2 - \beta_1)(1 - e^{-2kl})}{\frac{\beta_1}{\beta_2}\left(\beta_2^2 + \frac{F_1}{c_t^2}\right) - \frac{\beta_2}{\beta_1}\left(\beta_1^2 + \frac{F_1}{c_t^2}\right)},$$

$$F_1 = \omega^2\left(1 + \frac{i\varepsilon\overline{\omega}}{\omega + i\overline{\omega}}\right), L_0 = B_0 \cdot \frac{4\pi}{\varepsilon} \cdot \frac{\sigma c_t^2 \overline{\omega}}{c^2 \hat{\omega}} \cdot \frac{1 + i\overline{\omega}/\omega}{\omega^2 - \omega_*^2}$$

Coefficients $N_{1z}$, $N_{2z}$, $N_{1y}$, $N_{2y}$ may be determined using eqn. (15).

It is important to note that when $\omega = \omega_*$, then:

$$u_y^{ext} = -i \cdot u_z^{ext}$$

Measuring Re $u_y^{ext}$ and Im $u_z^{ext}$, it may be determined at what frequency, $\omega_*$, that these amplitudes of Re $u_y^{ext}$ and Im $u_z^{ext}$ are equal.

$$\omega_* = \frac{B_0}{c} \cdot \frac{\overline{\chi}^\sigma}{\alpha}.$$

As long as the following equality takes place:

$$\overline{\chi}/\alpha = \text{const},$$

using the last equation electric conductivity may be estimated, knowing the value $B_0$.

Figure 6:
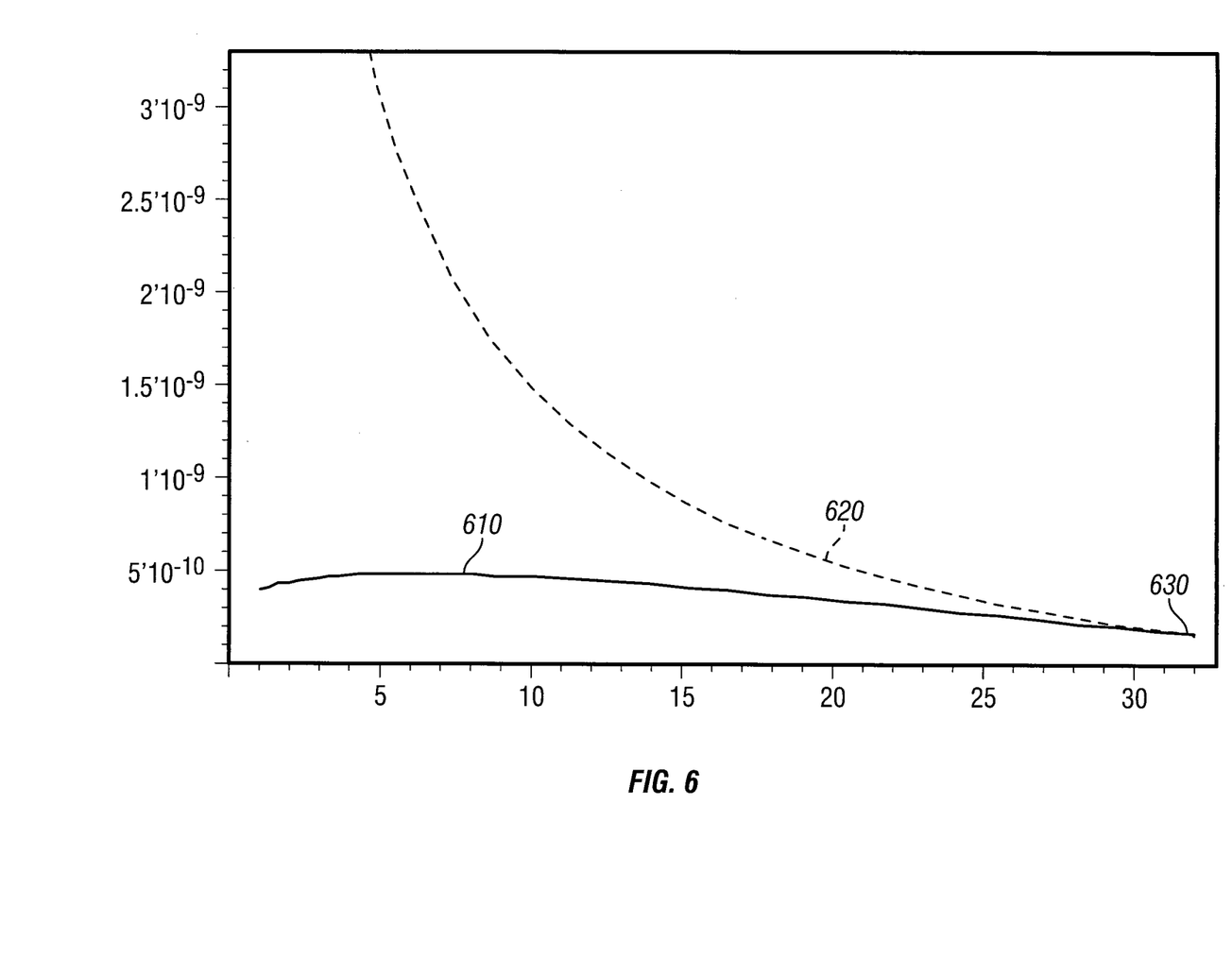
FIG. 6 is a graph illustrating the location of the characteristic frequency in one embodiment according to the present disclosure.

FIG. 6 shows a set of curves representing the amplitudes of the Re($-u_y^{ext}(\omega)$) 610 and Im ($-u_z^{ext}(\omega)$) 620 over a range of frequencies. It is directly seen that amplitudes of curves 610 and 620 are equal if $\omega = \omega_*$630.

In some embodiments, signal amplitudes may be increased by producing a harmonic magnetic field by running electric current through the casing tube 116. In this case:

$$B_z|_{x=0} = B_{oz}(\omega)$$

$$u_z|_{x=-l} = \frac{\varepsilon\overline{\omega}B_0}{4\pi\rho_l\omega^2[1 + i(1 + \varepsilon)\overline{\omega}/\omega]} \frac{\beta_1\beta_2}{\beta_1 + \beta_2} B_{oz}(\omega),$$

$$u_y|_{x=-l} = -\frac{i\varepsilon c_e \alpha}{4\pi\omega\sigma[1 + i(1 + \varepsilon)\overline{\omega}/\omega]} \frac{\beta_1\beta_2}{\beta_1 + \beta_2} B_{oz}(\omega),$$

-continued $$B_z^{ext}(x, \omega) = \frac{e^{-k(x+l)} - e^{k(x+l)}}{e^{-kl} + e^{kl}} B_{oz}(\omega),$$

$$B_y^{ext} = 0.$$

Figure 7:
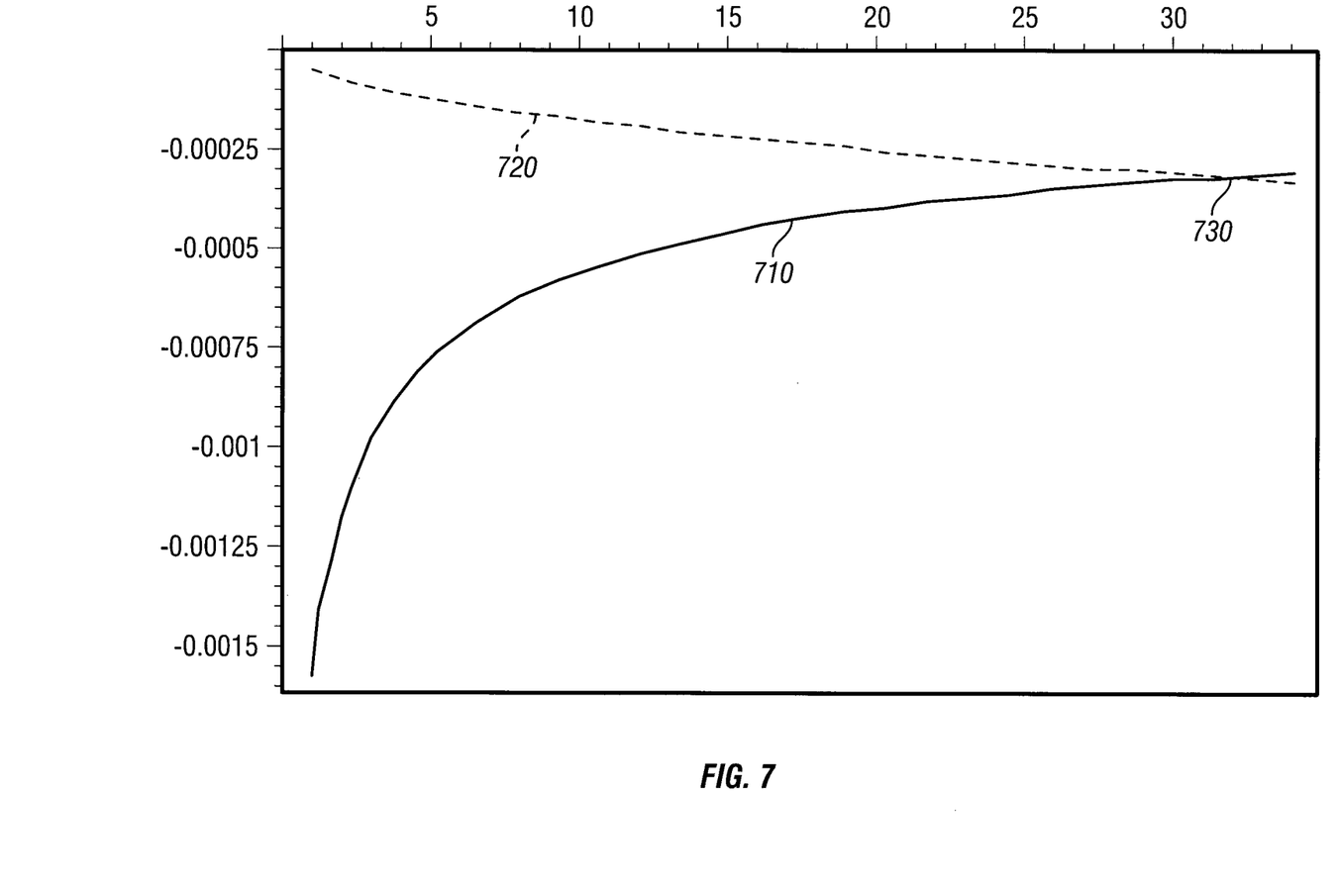
FIG. 7 is a graph illustrating the location of the characteristic frequency in another embodiment according to the present disclosure.

FIG. 7 shows a set of curves representing the amplitudes of the Re($-u_y^{ext}(\omega)$) 710 and Im ($-u_z^{ext}(\omega)$) 720 over a range of frequencies when the harmonic magnetic field 260 is produced by running an electric current along the casing tube 116. It is directly seen that amplitudes of curves 710 and 720 are equal if $\omega = \omega_*$730.

Using the characteristic frequency, conductivity may be estimated using either of the following equations:

$$\sigma = \frac{\alpha}{\overline{\chi}} \cdot \frac{c\omega_*}{B_0}$$

$$\sqrt{\sigma} = \frac{\sqrt{4\pi\omega_*}\,\rho_0 c_e |u_*|}{B_0 |B_{oz}(\omega_*)|} = \text{const},$$

$$u_* = u(\omega = \omega_*)$$

As described herein, the method in accordance with the presently disclosed embodiment of the disclosure involves several computational steps. As would be apparent by persons of ordinary skill, these steps may be performed by computational means such as a computer, or may be performed manually by an analyst, or by some combination thereof. As an example, where the disclosed embodiment calls for selection of measured values having certain characteristics, it would be apparent to those of ordinary skill in the art that such comparison could be performed based upon a subjective assessment by an analyst or by computational assessment by a computer system properly programmed to perform such a function. To the extent that the present disclosure is implemented utilizing computer equipment to perform one or more functions, it is believed that programming computer equipment to perform these steps would be a matter of routine engineering to persons of ordinary skill in the art having the benefit of the present disclosure.

Implicit in the processing of the acquired data is the use of a computer program implemented on a suitable computational platform (dedicated or general purpose) and embodied in a suitable machine readable medium that enables the processor to perform the control and processing. The term "processor" as used in the present disclosure is intended to encompass such devices as microcontrollers, microprocessors, field-programmable gate arrays (FPGAs) and the storage medium may include ROM, RAM, EPROM, EAROM, solid-state disk, optical media, magnetic media and other media and/or storage mechanisms as may be deemed appropriate. As discussed above, processing and control functions may be performed downhole, at the surface, or in both locations.

Although a specific embodiment of the disclosure as well as possible variants and alternatives thereof have been described and/or suggested herein, it is to be understood that the present disclosure is intended to teach, suggest, and illustrate various features and aspects of the disclosure, but is not intended to be limiting with respect to the scope of the disclosure, as defined exclusively in and by the claims, which follow.

While the foregoing disclosure is directed to the specific embodiments of the disclosure, various modifications will be apparent to those skilled in the art. It is intended that all such variations within the scope of the appended claims be embraced by the foregoing disclosure.

The invention claimed is:

1. A method of estimating a value of at least one parameter of interest of an earth formation, comprising:
   estimating the value of the at least one parameter of interest using a signal generated by a sensor responsive to acoustic waves,
   wherein the acoustic waves are generated in the earth formation and propagate through a metallic surface in physical communication with the earth formation, the metallic surface being exposed to a constant magnetic field normal to the metallic surface and a harmonic magnetic field at a plurality of frequencies along the metallic surface.

2. The method of claim 1, further comprising:
   applying the constant magnetic field normal to the metallic surface in communication with the earth formation;
   applying the harmonic magnetic field at the plurality of frequencies along the metallic surface; and
   generating the signal via the sensor responsive to the acoustic waves.

3. The method of claim 2, wherein the application of the harmonic magnetic field includes at least one of: (i) passing an alternating electric current through a coil and (ii) passing an alternating electric current through the metallic surface.

4. The method of claim 1, wherein estimating the value of the at least one parameter of interest further comprises:
   estimating a characteristic frequency.

5. The method of claim 4, wherein the characteristic frequency is defined by the formula:

$$\omega_* = \frac{B_0}{c} \cdot \frac{\bar{\chi}^\sigma}{\alpha},$$

where $\beta_0$ is a longitudinal magnetic field due to the constant magnetic field, c is the velocity of light, $\alpha$ is a coefficient linked to the electromagnetic constant, $\sigma$ is electrical conductivity, and $\bar{\chi}$ a friction coefficient.

6. The method of claim 1, wherein the at least one parameter of interest includes at least one of: (i) a characteristic frequency of the earth formation and (ii) a conductivity of the earth formation.

7. The method of claim 1, wherein the metallic surface includes a borehole casing.

8. A computer-readable medium product having instructions thereon that, when executed, cause at least one processor to perform a method, the method comprising:
   estimating a value of at least one parameter of interest using a signal generated by a sensor responsive to acoustic waves,
   wherein the acoustic waves are generated in the earth formation and propagate through a metallic surface in physical communication with an earth formation, the metallic surface being exposed to a constant magnetic field normal to the metallic surface and a harmonic magnetic field at a plurality of frequencies along the metallic surface.

9. The computer-readable medium product of claim 8 further comprising at least one of: (i) a ROM, (ii) an EPROM, (iii) an EEPROM, (iv) a flash memory, or (v) an optical disk.

10. An apparatus configured to estimate a value of at least one parameter of interest of an earth formation, comprising:
    a tool configured to be conveyed into a borehole traversing an earth formation;
    a first magnetic source on the tool configured to apply a constant magnetic field to a metallic surface in physical communication with the earth formation, the constant magnetic field being in a direction normal to the metallic surface;
    a second magnetic source on the tool configured to apply a harmonic magnetic field at a plurality of frequencies along the metallic surface;
    a sensor configured to generate a signal in response to acoustic waves generated in the earth formation and propagating through the metallic surface; and
    at least one processor configured to estimate the value of the at least one parameter of interest using the signal.

11. The apparatus of claim 10, wherein the first magnetic source includes at least one of: (i) a permanent magnet and (ii) an electromagnet.

12. The apparatus of claim 10, wherein the second magnetic source includes a coil.

13. The apparatus of claim 10, wherein the second magnetic source includes a pair of electrodes configured to pass an alternating electric current through the metallic surface.

14. The apparatus of claim 10, wherein the at least one parameter of interest includes at least one of: (i) a characteristic frequency of the earth formation and (ii) a conductivity of the earth formation.

15. The apparatus of claim 10, wherein the metallic surface includes a borehole casing.

* * * * *